June 15, 1965  J. A. HAEBER  3,189,098
MARINE CONDUCTOR PIPE ASSEMBLY
Filed Dec. 29, 1961  6 Sheets-Sheet 1

INVENTOR:
JOHN A. HAEBER
BY: J. H. McCarthy
HIS AGENT

June 15, 1965  J. A. HAEBER  3,189,098
MARINE CONDUCTOR PIPE ASSEMBLY
Filed Dec. 29, 1961  6 Sheets-Sheet 2

INVENTOR
JOHN A. HAEBER
BY J. H. McCarthy
HIS AGENT

June 15, 1965 J. A. HAEBER 3,189,098
MARINE CONDUCTOR PIPE ASSEMBLY
Filed Dec. 29, 1961 6 Sheets-Sheet 3

INVENTOR
JOHN A. HAEBER
BY J. H. McCarthy
HIS AGENT

INVENTOR:
JOHN A. HAEBER
BY: J. H. McCarthy
HIS AGENT

INVENTOR
JOHN A. HAEBER
BY J. H. McCarthy
HIS AGENT

June 15, 1965   J. A. HAEBER   3,189,098
MARINE CONDUCTOR PIPE ASSEMBLY
Filed Dec. 29, 1961   6 Sheets-Sheet 6

INVENTOR
JOHN A. HAEBER
BY
HIS AGENT 3,189,098
MARINE CONDUCTOR PIPE ASSEMBLY
John A. Haeber, Houston, Tex., assignor to Shell Oil
Company, New York, N.Y., a corporation of Delaware
Filed Dec. 29, 1961, Ser. No. 163,242
7 Claims. (Cl. 166—66.5)

This invention relates to apparatus for use in drilling, completing and working-over operations in oil and gas wells at offshore locations, and pertains more particularly to apparatus adapted to provide fluid communication between a vessel on the surface of a body of water and a wellhead assembly positioned on the ocean floor or at a substantial depth below the surface of the water.

In an attempt to locate new oil fields, an increasing amount of well drilling has been conducted at offshore locations, such for example as off the coast of Louisiana, Texas and California. As a general rule, the strings of casing in a well, together with the tubing strings or string, extend to a point above the surface of the water where they are closed in a conventional manner that is used on land wells, with a conventional wellhead assembly being attached to the top of the casing. Recently, methods and apparatus have been developed for drilling and completing wells wherein both the well casinghead, and subsequently the wellhead assembly and casing closure device, are located underwater at a depth sufficient to allow ships to pass over them. Preferably, the casinghead and the wellhead closure assemblies are located close to the ocean floor. In order to install well drilling equipment underwater at depths greater than the shallow depth at which a diver can easily operate, it has been necessary to design entirely new equipment for this purpose.

Wells drilled in deep water, are drilled from vessels from varying designs commonly known as drilling barges or drilling vessels. Deep water wells are generally drilled by one of two methods. In one method the string of drill pipe extends downwardly from the drilling barge to the drilling wellhead assembly on the ocean floor which is closed at the top by a circulation head with a flexible hose running from the circulation head back to the surface and to the drilling barge so that drilling fluid may be circulated down the drill pipe, through the drill bit, and thence upwardly on the outside of the drill pipe, out the circulation head and up the flexible hose to the barge again. In the second method, a large diameter pipe known as a marine conductor pipe is put together and arranged to extend from the drilling wellhead assembly on the ocean floor to the barge on the surface of the water. In the latter method the drill pipe rotates within the conductor pipe with drilling fluid being circulated down through the bit at the bottom thereof, up the outside of the drill pipe and thence upwardly through the annular space between the conductor pipe and the drill pipe to return to the barge. The present invention is concerned with apparatus to be used in the second method described hereinabove.

Time is of the essence in offshore well drilling operations since rental on a floating drilling barge may run about $6,000 per day or more. Thus, the equipment employed in offshore well drilling operations must be of rugged design with little chance of failure which would result in lost time in replacing the damaged unit. At the same time the equipment must be able to be broken down into sections that can be readily stored and handled on a drilling barge. Additionally, the broken-down sections of equipment must be connectible in a relatively short time so as to reduce the cost of the operations.

It is therefore a primary object of the present invention to provide a marine conductor pipe assembly of rugged design which can be built in sections small enough to be handled easily on a drilling barge while being provided with with means for connecting the various sections together easily and quickly.

A further object of the present invention is to provide a sectionalized marine conductor pipe assembly whose sections are each equipped with one or more small diameter pipe lines arranged on the outside of the large diameter conductor pipe in a manner such that both pipes can be connected simultaneously to corresponding adjacent sections of pipe.

Another object of the present invention is to provide a sectionalized marine conductor pipe assembly having a remotely-operable landing head assembly positioned on the lower end of the lowermost section with the pressure lines for operating the landing head assembly being carried on the outside of the conductor pipe sections for ready connection one to another as the sections of conductor pipe are put together.

A still further object of the present invention is to provide quick-release manually-operated connector means on one end of each conductor pipe section which is designed to mate with an end of an adjacent section of conductor pipe.

Still another object of the present invention is to provide a sectionalized marine conductor pipe assembly having auxiliary pipe lines secured thereto and extending colongitudinally therewith, with the lower end of the conductor pipe and its landing head arranged relative to the lower end of the auixliary pipes in a manner such that the landing head at the bottom of the marine conductor pipe is in connectible engagement with a mating tubular member on the underwater wellhead assembly before the lower ends of the auxiliary pipes telescopically engage other mating tubular well members.

It is also an object of the present invention to provide a marine conductor pipe assembly having axuiliary conduits carried on the outside thereof where the lower ends of the auxiliary conduits which are connectible to an underwater wellhead assembly have a degree of flexibility relative to a lower end of the conductor pipe or the landing head carried thereon.

These and other objects of this invention will be understood from the following description taken with reference to the drawing, wherein:

FIGURE 4 is a longitudinal view taken in partial cross section of an upwardly continuation of the marine conductor pipe of the present invention;

Figure 1:
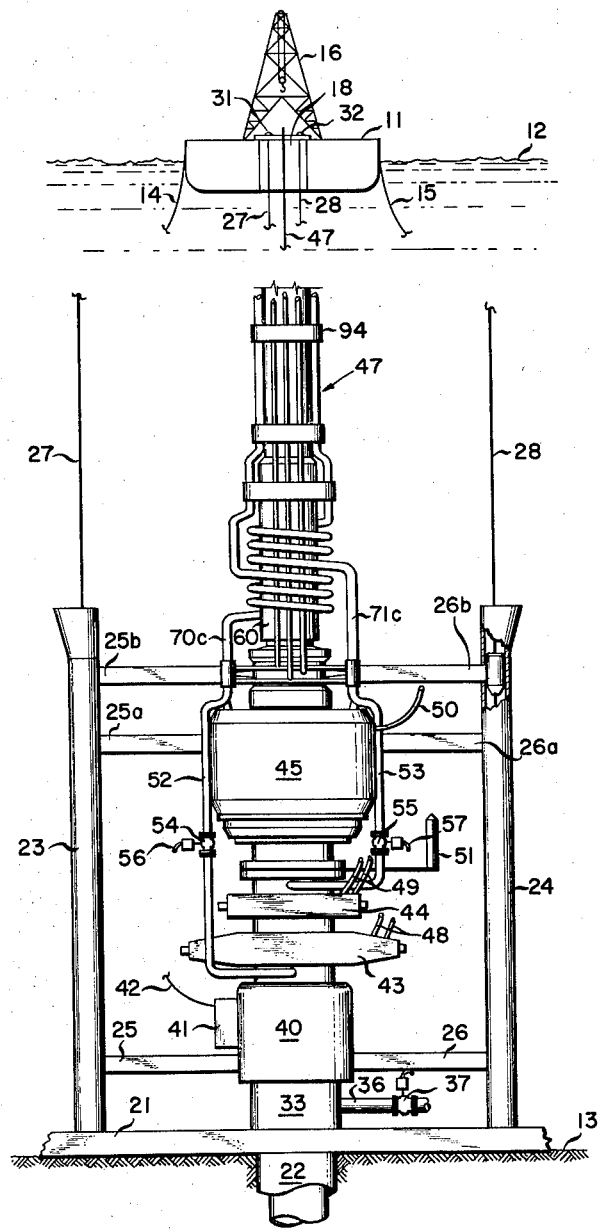
FIGURE 1 is a diagrammatic view taken on longitudinal projection illustrating a floating drilling barge positioned on the surface of the ocean with an underwater wellhead assembly positioned on the ocean floor.

Referring to FIGURE 1 of the drawing, a drilling platform or barge 11, of any suitable floatable type is illustrated as floating on the surface of a body of water 12 and substantially fixedly positioned over a preselected drilling location by suitable barge positioning means or by being anchored to the ocean floor 13 by suitable anchors (not shown) connected to the anchor lines 14 and 15. Equipment of this type may be used when carrying on well drilling operations in water depths varying from about 100 to 1500 feet or more. The drilling barge is equipped with a suitable derrick 16 as well as other auxiliary equipment needed during the drilling of a well. The derrick 16 is positioned over a drilling slot or well 18 which extends vertically through the barge in a conventional manner. When using the equipment of the present invention the slot of the barge 11 may be either centrally located or extend in from one edge. However, drilling operations may be carried out over the side of the barge or vessel without the use of a slot. Additionally, it is to be understood that the equipment of the present invention may be also used when drilling a well from any suitable operational base positioned above the surface of the water, such for example, as from a drilling barge having feet extending to the ocean floor or from a platform permanently positioned on the ocean floor.

A typical underwater wellhead structure is illustrated in FIGURE 1 as comprising a base member 21 which is positioned on the ocean floor 13 and is fixedly secured to a conductor pipe or a large diameter well casing 22 which extends down into a well, which has been previously drilled, and is preferably cemented therein. Thus, the base structure 21 is rigidly secured to the ocean floor in order to support two or more vertically-extending guide columns 23 and 24 adapted to receive and guide therein guide arms 25 and 26, 25a and 26a, and 25b and 26b, which are arranged to slide on vertically-extending guide cables 27 and 28. The lower ends of the guide cables 27 and 28 are anchored to the base structure 21 within the guide columns 23 and 24 while extending upwardly through the water to the drilling barge 11 where they are preferably secured to constant tension hoists 31 and 32. It is to be understood that in an emergency a single guide arm on a guide cable extending between the base structure 21 and the drilling vessel 11 may be employed to position a piece of equipment on the wellhead. As will be described hereinbelow, a guide system having at least 3 guide cables is preferred.

Centrally positioned above the base plate 21 and fixedly secured thereto, or to the conductor pipe 22, is a well casinghead unit 33 which may be provided with a cement circulation or fluid return line 36 which may be selectively closed by a remotely-operated valve 37. The guide arms 25 and 26 are illustrated as being connected to a wellhead connector unit 40 which may be hydraulically or electrically actuated to connect to the top of the casinghead 33 in a manner described in copending patent application Serial No. 105,068, filed April 24, 1961. In the above identified patent application, a wellhead connector 40 is provided with a self-contained electrohydraulic operating unit represented here diagrammatically by element 41 which is provided with operating power by an electrical transmission line 42 running to the barge 11 at the surface. Alternatively, the wellhead connector could be hydraulically operated by means of a pressure fluid line running to the barge 11.

During the drilling of a well, one or more blowout preventers are connected coaxially above the wellhead connector 40. In FIGURE 1 a series of three blowout preventers 43, 44 and 45 are illustrated as being fixedly secured together and forming a unitary package with the wellhead connector 40, which package is adapted to be lowered onto the casinghead 33 in any suitable manner. Preferably the combined blowout preventers 43, 44 and 45 and the wellhead connector 40 are run together into position on top of the well by being lowered through the water from the drilling vessel 11 by means of a pipe string (not shown), commonly known as a running string, with the lower end of the running string being connected to the uppermost blowout preventer 45 by any suitable coupling or connector which may be similar in form to the wellhead connector 40. During drilling operations the running string is replaced by a larger diameter-pipe string known as a marine conductor pipe and is represented generally in FIGURE 1 by numeral 47.

The various wellhead components, such for example as the wellhead connector 40 and blowout preventers 43, 44 and 45, may be either hydraulically, pneumatically or electrically actuatable but are preferably hydraulically actuatable with each unit being provided with an electrohydraulic operator unit similar to 41 on wellhead connector 40, as described in copending patent application, Serial No. 105,068, filed April 24, 1961. Alternatively, the blowout preventers 43, 44 and 45 could be provided with pressure hoses 48, 49 and 50 which would extend up through the water to the drilling barge 11. Alternatively, these or other hoses could extend to a secondary control unit 51, which system is described and claimed in copending patent application, Serial No. 162,693 filed December 28, 1961. In addition, the drilling assembly or stack or blowout preventers 43, 44 and 45 on top of the wellhead connector 40 is provided with one or preferably two small-diameter conduits which will be termed hereinbelow as choke and kill lines 52 and 53, respectively. The choke and kill lines 52 and 53 are employed to provide means for establishing fluid communication between the drilling vessel 11 and the well during drilling operations after one or more of the blowout preventers 43, 44 and/or 45 have been closed during an emergency. Thus, the choke line 52 is in communication at its lower end with the interior of the assembly below the lowermost blowout preventer 43 while the kill line 53 is in communication with the interior of the assembly below the uppermost blowout preventer 45. The choke and kill lines 52 and 53 are provided with remotely actuatable valves 54 and 55, respectively, which have pressure hoses or electrical transmission lines 56 and 57 which extend to the surface, to an operator, or to the secondary control unit 51. Since these valves and their connection to the related units do not form an essential part of the present invention and are described in detail in the above-identified copending patent applications, they will not be further described here.

A marine conductor pipe assembly is employed in drilling underwater wells in order to establish communication with the well in a manner shown and described in U.S. Patent 2,606,003 which was issued August 5, 1952 to J. M. McNeill. The marine conductor pipe is of sufficient diameter so that a drill pipe and a drill bit at the lower end of the drill pipe can be run down through the marine conductor so as to bore into the ocean floor. Thus, the annular space between a drill pipe and the inner wall of a marine conductor pipe forms a passage for return of fluid to the drilling barge together with cuttings removed from the bottom of the well by the drill bit. Drilling mud would be pumped by means of a pump on the barge down the drill string (not shown), out the drill bit, up the space outside the drill pipe in the well to the wellhead on the ocean floor, and thence upwardly through the marine conductor pipe outside the drill pipe to the barge.

Figure 2:
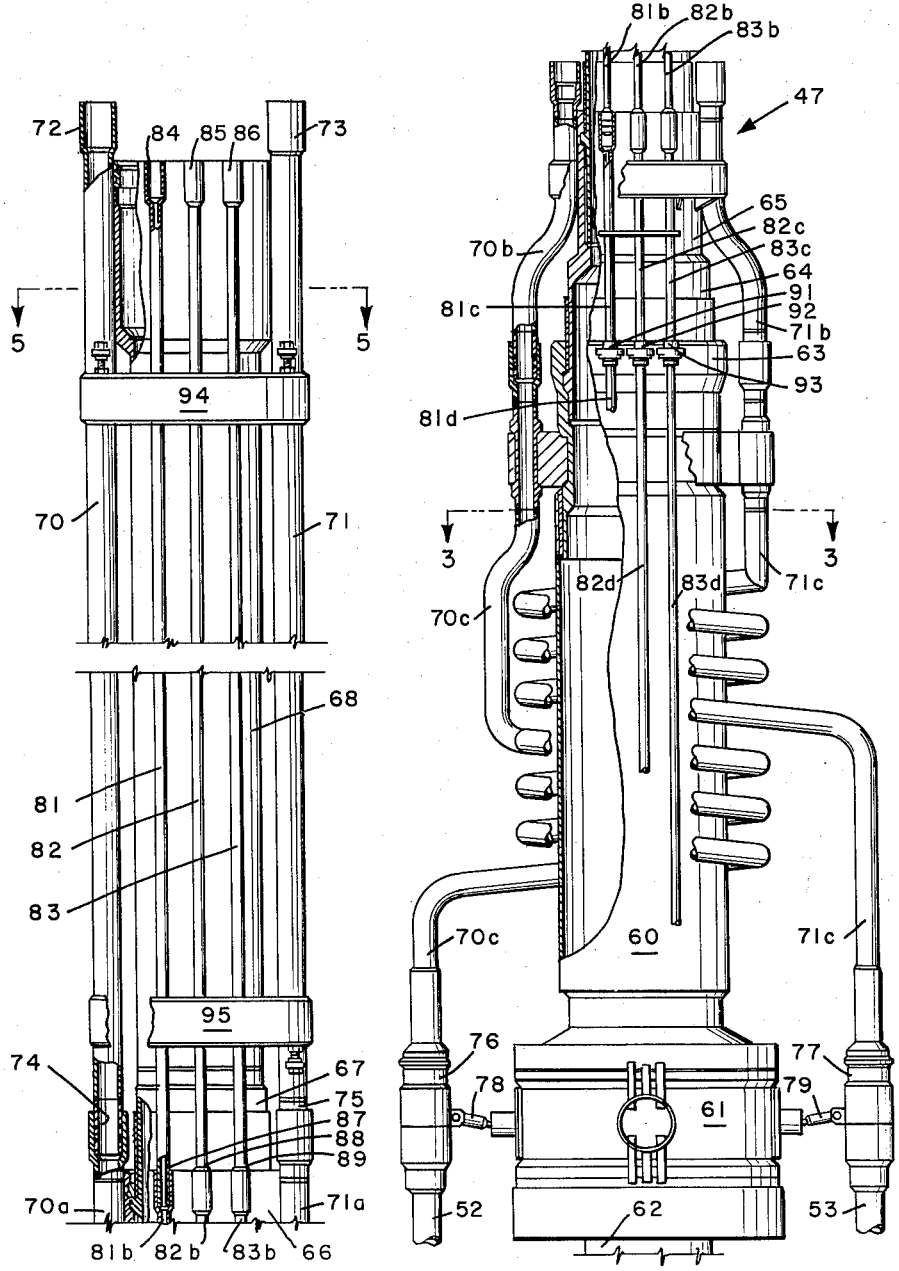
FIGURE 2 is a longitudinal view taken in partial cross section of the lowermost section of a marine conductor pipe assembly of the present invention.

The marine conductor pipe assembly, generally represented by numeral 47 in FIGURE 1, is shown in FIGURES 2 and 4 in detail, FIGURE 4 representing an upward extension of the apparatus of FIGURE 2. In order to facilitate handling of the marine conductor pipe of the present invention on a drilling vessel and to aid in the construction of the marine conductor so that it extends from the drilling vessel 11 (FIGURE 1) to the uppermost blowout preventer 45 of the drilling stack, the marine conductor pipe assembly 47 is made up in a number of sections, one section being similar to the other except for the lowermost section which is shown in FIGURE 2. The lowermost section of the marine conductor comprises a large-diameter pipe 60 having fixedly secured to its lower end a landing head 61 of a size to fit telescopically on and sealingly engage a landing mandrel which is fixedly secured at its lower end to the uppermost blowout preventer 45, and extends upwardly and coaxially therefrom. The female portion 63 of a suitable connector is formed at the upper end of the conductor pipe section 60 for connection to the male portion 64 of the connector which is formed at the lower end of the next higher section 65 of the marine conductor. In turn the female portion 66 (FIGURE 4) of this section is connected to the male portion 67 of another connector at the lower end of the next conductor pipe section 68 (FIGURE 4). A typical suitable connector for this purpose is described hereinbelow.

Fixedly secured to the outside of each conductor pipe section 68 (FIGURE 4) is at least one and preferably two small diameter pipes 70 and 71 which are provided at their upper ends with one-half of a connector, say, female portions 72 and 73 of couplings while the male portions 74 and 75 of similar couplings are provided at the lower ends of the pipes 70 and 71, respectively.

The small-diameter pipes 70 and 71, are in communication at their lower ends with similar pipes 70a and 71a, respectively. Pipe section 70a is in turn in communication with section 70b (FIGURE 2) therebelow which is coupled to section 70c. It is to be noted that in this particular arrangement the small-diameter pipe section 70c makes several turns around the marine conductor pipe section 60 prior to resuming its parallel course thereto. In a like manner the small-diameter pipe section 71a (FIGURE 4) is coupled to a pipe section 71b (FIGURE 2) and thence to section 71c which makes several turns around the lower end of the marine conductor pipe section 60. The lower ends of the pipe sections 70c and 71c are provided with suitable connectors 76 and 77 which are preferably of the type that may be fixedly locked to the mating portion of the unit which is secured to the top of the choke and kill lines 52 and 53, respectively. Additionally, the connectors 76 and 77 carried at the lower end of the small-diameter pipes 70c and 71c are preferably flexibly connected as by means of swivel units 78 and 79, to the landing head 61. The purpose of having the small diameter pipes 70c and 71c make one or more turns around the lower end of the lowermost marine conductor pipe section 60 is to provide for stress distribution in lines 70 and 71 when marine conductor is pushed laterally as when the rig moves away from a position directly over the hole. Swivel units 78 and 79 provide the requisite flexibility for stabbing purposes. Swivel units also provide sufficient allowable motion to let the choke and kill line connectors remain locked and immobile when the marine conductor landing head translates due to vessel movement.

In the event that the connectors 76 and 77 as well as the landing head 61 are of the hydraulically or pneumatically-actuated type as herein preferred, it would be necessary to run hydraulic lines from the barge down along side the marine conductor pipe assembly to actuate these units. Rather than have loose flexible hydraulic pressure lines in the water adjacent the marine conductor pipe assembly, each section of marine conductor, say 68, may be provided with one or more small-diameter pressure conduits 81, 82 and 83 which are provided with suitable couplings 84, 85, 86 at their upper ends and mating units 87, 88 and 89 at their lower ends, preferably stab-type couplings, for connecting to couplings carried by adjacent sections of the marine conductor. The pressure conduits or lines 81, 82 and 83 continue downwardly as sections 81b, 82b and 83b then to 81c, 82c and 83c and thence to 81d, 82d and 83d. Flange-type couplings 91, 92 and 93 are shown as connecting the lowermost sections of pressure lines 81d, 82d and 83d to their adjacent sections.

Figure 3:
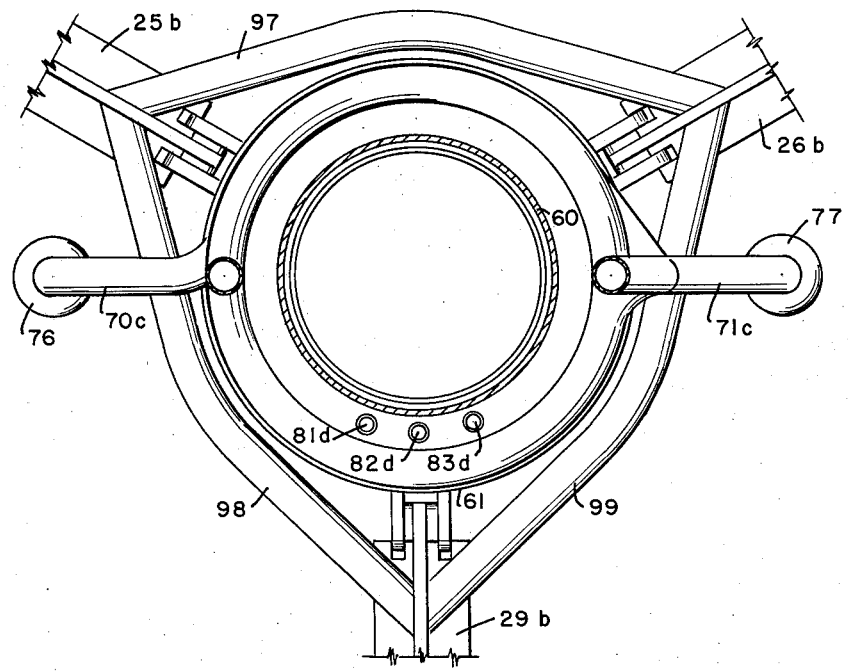
FIGURE 3 is a cross-sectional view taken along the line 3—3 of FIGURE 2.
Figure 5:
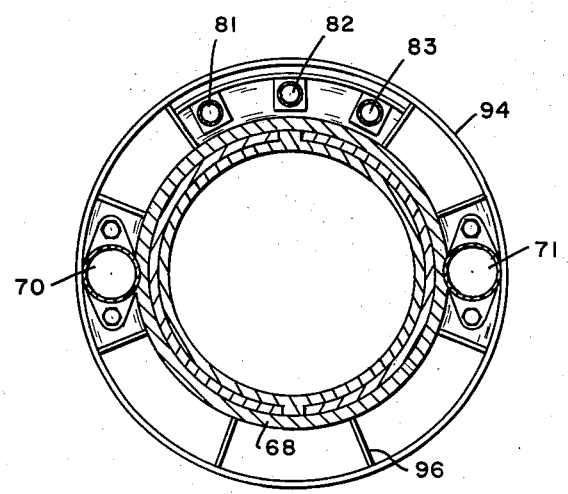
FIGURE 5 is a cross-sectional view taken along the line 5—5 of FIGURE 4.

It is understood that the pressure conduits 81, 82 and 83 may be of a flexible material if desired but are preferably rigid. Additionally, it is understood that the flexibility provided to small-diameter pipe section 70c and 71c by the several turns around the marine conductor pipe section 60 could be eliminated by providing a section of flexible high pressure hose instead. As shown in FIGURE 4, the small-diameter pipes 70 and 71 and the pressure conduits 81, 82 and 83 are fixedly secured to circular rings 94 and 95. As shown in FIGURE 5, the ring 94 is of rigid construction, being provided with reinforcing ribs 96 which are welded to the inner surface of the ring and to the outer surface of the marine conductor pipe section 68 and extend radially outwardly from the latter and beyond all the small-diameter pipes secured thereto. The rings 94 and 95 provide means whereby the separate sections of marine conductor pipe may be rolled on the deck of the drilling vessel 11 after they have been disconnected one from the other. In FIGURE 3 the guide arms 25b, 26b and 29b which are fixedly secured to the landing head 61, are shown as being reinforced by bracing members 97, 98 and 99 which are welded to the arms.

Figure 6:
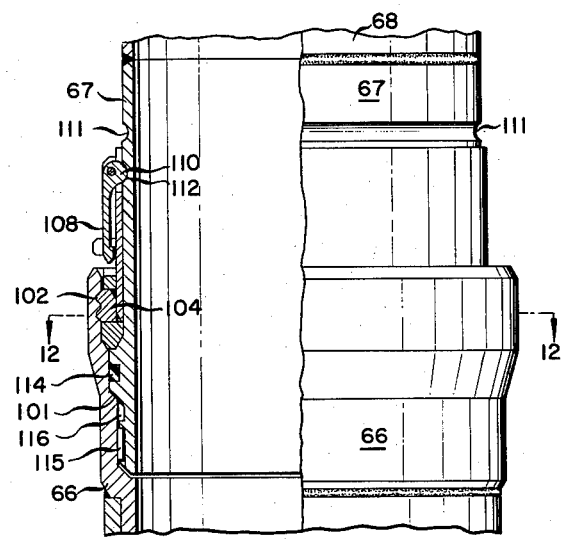
FIGURE 6 is a longitudinal view taken in partial cross section of one form of a manually-operated quick-release connector device for coupling together sections of the marine conductor pipe assembly of FIGURES 2 and 4.
Figure 7:
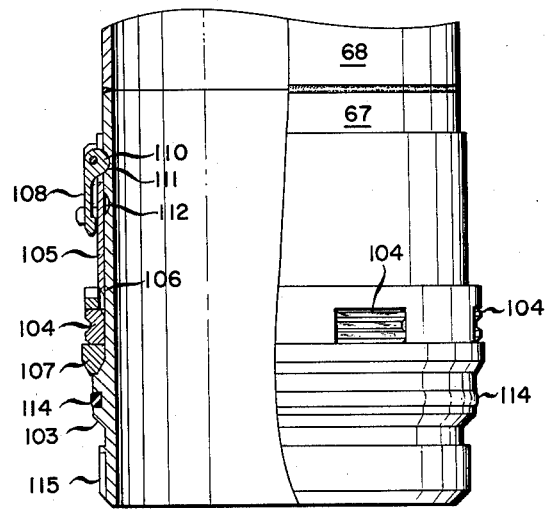
FIGURE 7 is a longitudinal view taken in partial cross section of the male portion of the connector device of FIGURE 6.
Figure 12:
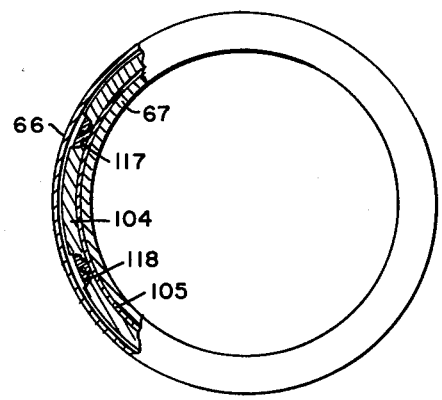

In FIGURES 6 and 7 one form of a quick-connect and quick-disconnect connector unit for the marine conductor pipe is shown. The female portion 66 of the connector unit (FIGURE 6) is provided with a landing surface 101 and locking grooves 102 on the inner wall thereof. The male portion 67 is provided with a shoulder 103 formed on the outer surface thereof for engaging the landing surface 101 of the female portion of the coupling. A plurality of locking dogs are mounted on the male portion of the coupling for radially outward extending movement therefrom. These dogs, or latches, 104 are of a form to engage the locking shoulders or grooves 102 of the female portion of the connector. The dogs are moved outwardly by an axially-slidable sleeve 105 carried outwardly on the male connector 67 and being provided at its lower end with a camming surface 106 which forces the dogs outwardly as the sleeve 105 moves downwardly and seats against a stop member 107 carried outwardly on the male connector member. The sleeve 105 can be quickly moved from an inoperative to an operative position by means of suitable handles, such as handle 108. Means are also provided for locking the sleeve 105 in its operative or inoperative positions. In this arrangement the lock is formed by a camming portion 110 of the handle 108 which is adapted to seat in one of two grooves 111 or 112. As the handle is raised, the camming lock portion 110 thereof is disengaged from the grooves so that the sleeve 105 is freely slidable on the outer surface of the male connector portion 67. Suitable seal means such as a ring of packing material 114 is provided for sealing the space between the male and female portions 67 and 66, respectively, of the coupling. Any suitable device may also be provided for locking the handles 108 in their engaging position although this is not necessary. In FIGURE 6 the male and female members are shown connected together with the sleeve 105 forcing the dogs 104 into the locking grooves 102. In FIGURE 7 the male portion 67 of the connector unit is shown as being removed from the female portion with the sleeve 105 in its raised position. The upper faces of the locking dogs 102 are bevelled so that an upward pull on the male portion of the connector forces the locking dogs back into their recesses when the sleeve 105 has been moved out from in back of the dogs. The male portion of the coupling is also preferably provided with a key 115 for seating in a mating keyway 116 in the female member. The key 115 and keyway 116 are employed to orient lines 70, 71, 81, 82 and 83 with respect to pipe sections 70a, 71a, 81b, 82b, and 83b, while a stab is being made. The key and keyway 116 also serves as an anti-rotation device between sections of a marine conductor having no small-diameter conduits. Use of rotation limiting means between adjacent sections of the marine conductor pipe reduces the chance of any section of the marine conductor pipe being moved or rotated by the rotating drill pipe within the conductor pipe during drilling operations. By keying one section of the marine conductor pipe to another the possibility of wear on the seating shoulders or seal is eliminated. The locking dogs 104 are suitably shaped so that they do not fall out of the male portion of the connector when it is not engaging the female portion. As shown in FIGURE 12 the dogs 104 may be provided with dove-tails 117 which engage wedges 118 fixedly secured to the male member to prevent the locking dogs from falling out. The wedge-shaped portions 118 form part of the outer surface of the male member between the dogs.

Figure 8:
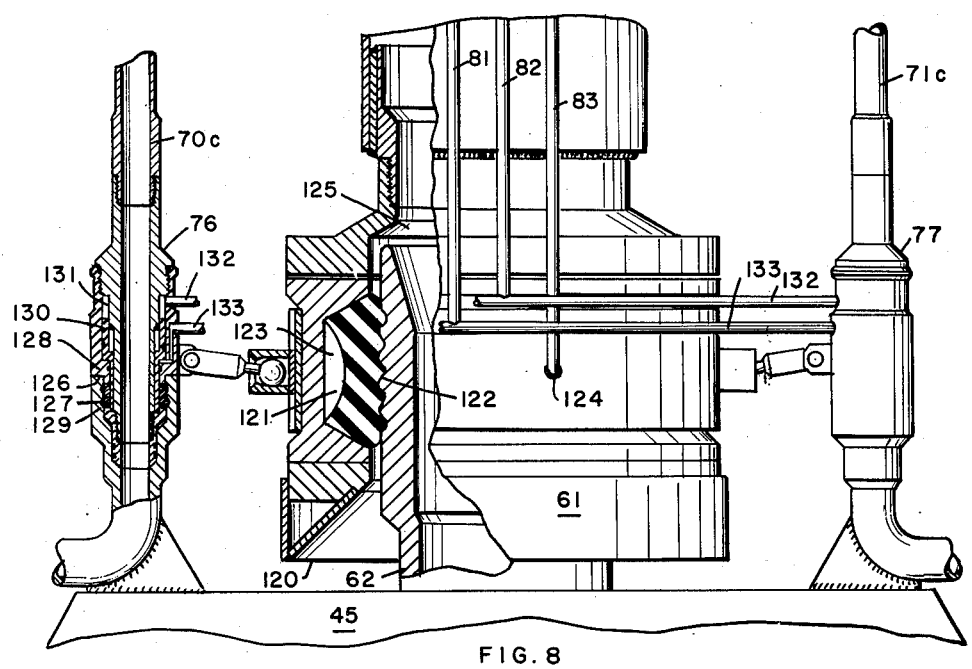
FIGURE 8 is a longitudinal view taken in partial cross section of the landing head assembly at the lower end of the marine conductor assembly of FIGURE 1 in its seated position on the landing mandrel of a blowout preventer.
Figure 11:
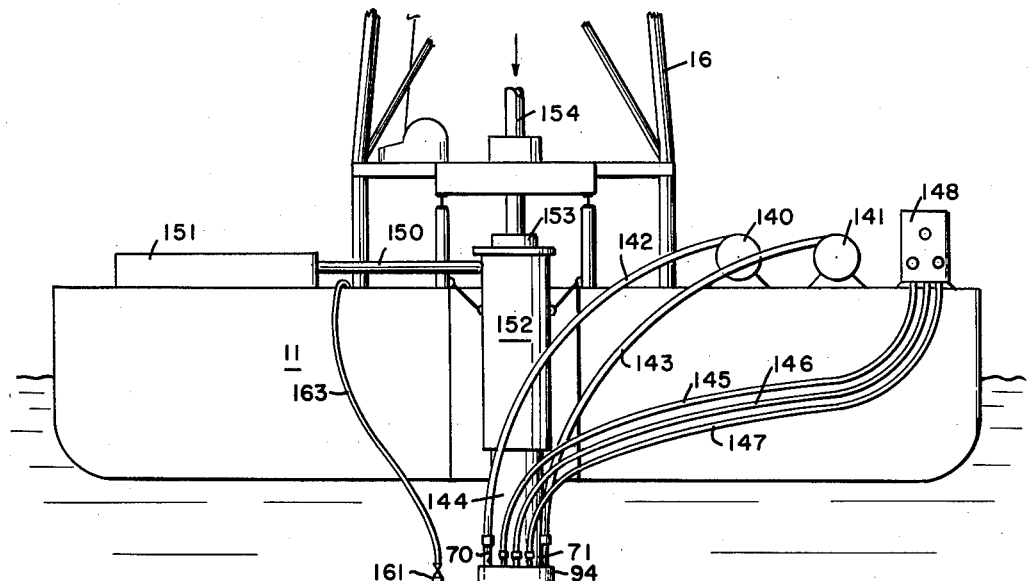
FIGURE 11 is a diagrammatic view illustrating the position of the upper end of the marine conductor pipe in the drilling barge at the surface of the water; and, FIGURE 12 is a cross sectional view taken along the line 12—12 of FIGURE 6.

In FIGURE 8 one form of a landing head 61 is shown as being provided with an outwardly flaring skirt at its lower end to facilitate engagement with the upper end of the landing mandrel 62 when the former is lowered onto the latter. A suitable seal is employed between the landing head 61 of the marine conductor pipe assembly and the landing mandrel 62 on the top of the blowout preventer 45. While a static seal could be employed in some cases, the sealing element 121 is preferably arranged within the landing head 61 so that it can be expended inwardly against the landing mandrel which is preferably provided with a series of circumferential grooves 122 on the outer surface thereof. The space 123 in back of the annular seal 121 is in communication through a port 124 in the outer wall of the landing head 61 with a pressure line 83 by which a pressure fluid may be pumped down from the drilling barge to inflate the sealing element 121. The landing head 61 is also provided preferably with a landing shoulder 125 on the inner surface thereof for resting in weight-supporting engagement on the top of the mandrel 62. Alternatively, the weight of the entire marine conductor pipe could be taken off the drilling wellhead assembly by cables connected to the conductor pipe and to constant tension hoists on the drilling barge, and/or by buoyancy tanks secured to one or more sections of conductor pipe, at least one of the tank being provided with means, controllable from the barge, for flooding or evacuating the tank to adjust the buoyancy of the entire conductor pipe. In FIGURE 11 a donut-shaped buoyancy tank 160 is illustrated as being secured to ring elements 94 and 95 on the top section of the conductor pipe. The tank 160 is provided with valved inlet and outlet ports 161 and 162 which may be connected by a line 163 to a suitable pump or compressor (not shown) on the barge for filling or evacuating part or all of the tank.

As shown in FIGURE 8 the connectors 76 and 77 at the lower ends of the choke and kill lines 70c and 71c, respectively, may be similar to the marine conductor pipe connector units described with regard to FIGURES 6 and 7. Thus, the female portion of the connector may be provided with a seating shoulder 126 and locking grooves 127 while the male portion is provided with a mating seating shoulder 128 and locking dogs 129 of a size and shape to fit within the locking grooves 127. The dogs 129 are moved outwardly by downwardly-moving sleeve 130 which is enclosed and is movable within a chamber 131 by the application of a pressure fluid either above the sleeve 130 through conduit 132, or below the sleeve through conduit 133. The conduits 132 and 133 are preferably manifolded together with conduit 132 being in communication with pressure line 82 and conduit 133 being in communication with pressure line 82 which extends downwardly along side the marine conductor pipe. Thus, both connector 76 and 77 could be actuated to a locking position by the application of pressure fluid through conduit 82 and thence through conduit 132 to drive the pistons in both connectors downwardly and cause the locking dogs 129 to move outwardly into the locking grooves 127 of the female units. By releasing the pressure fluid on pressure line 82 and applying it to pressure line 81, both connectors could be unlocked. Normally, during drilling operations, pressure fluid would be constantly applied through pressure line 83 to maintain the seal 121 against the landing mandrel 62.

Figure 9:
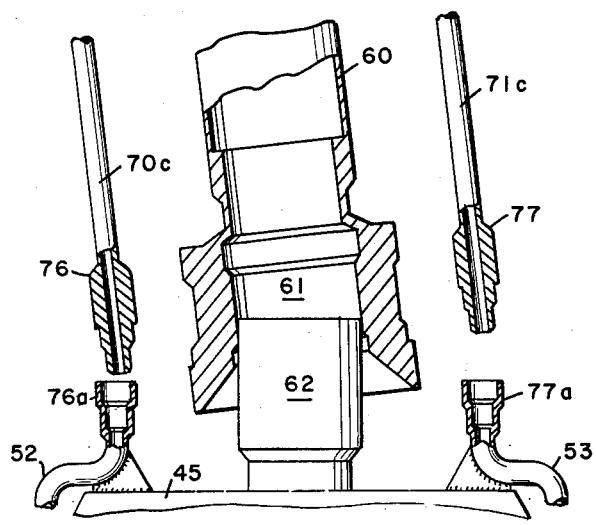
FIGURE 9 is a schematic view of the lower end of a conductor pipe and two adjacent auxiliary pipes illustrating the special relationship between the lower ends of the conductor pipe and the auxiliary pipes.

While it has been found that the guide system described with regard to FIGURE 1 for lowering the present equipment to the ocean floor and into engagement with wellhead equipment previously positioned has been found to be extremely accurate, the eventuality may arise that the lower ends of the small diameter pipe 70c and 71c are not in a horizontal line at the time they engage their mating couplings on the top of the blowout preventer 45. This would cause one of the small diameter pipes, say 70c, to be subjected to considerable bending forces and the seating surface of the connector at the bottom of the line may be damaged. To preclude this possibility, it is preferred, as illustrated in FIGURE 9, that the landing head 61 extend downwardly beyond the connector devices 76 and 77 carried at the lower ends of the small diameter pipe lines 70c and 71c. The landing head would extend downwardly beyond the connectors 76 and 77 a distance sufficient so that the landing head 61 would come into connectible engagement on the landing mandrel 62, as illustrated, before either of the connectors 76 or 77 telescopically engaged their mating tubular members 76a and 77a at the tops of the choke and kill lines 52 and 53, respectively. Thus, continued movement of the landing head 61 downwardly on the landing mandrel 62 in FIGURE 9 would cause the lower section 60 of the marine conductor pipe to become more vertically aligned with the landing mandrel 62 before the connectors 76 and 77 moved into engagement with their mating sections.

Figure 10:
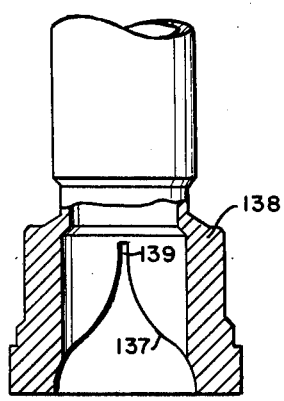
FIGURE 10 is a schematic view illustrating one form of aligning means for use on the lower end of the conductor pipe and the tubular well member to which it is mated.

Although all connections of one section of marine conductor pipe to another would occur on board the drilling vessel so that the drilling personnel could readily align the connectors of one section with those of another, it may be desirable in certain circumstances to provide aligning means on the male and female connector portions of each section of marine conductor pipe. As shown in FIGURE 10, the male portion 135 of one section of pipe may be provided outwardly extending keys 136 adapted to engage a sloping shoulder 137 formed on the inner wall of a female unit of an adjacent section of conductor pipe. Thus, in moving the male and female portions 135 and 138 together the key 136 would engage the shoulder 137 at some point thereon and move along the sloping shoulder until it seated in a slot 139.

At the surface, the uppermost sections 70 and 71 would be connected by flexible hose or flexibly jointed pipe means to pumps 140 and 151. The conduits diagrammatically illustrated at 142 and 143 represent any suitable type of flexible pipe. In a like manner the three pressure lines coming up alongside the uppermost section 144 of the marine conductor pipe may be connected by means of flexible lines 145, 146 and 147 to a suitable manifolding unit 148 for supplying or maintaining pressure on these lines and to the units below. It is to be understood that instead of hydraulic pressure lines these may be electrical transmission lines to operate electrically actuatable connectors and a landing head at the lower end of the marine conductor pipe. Further, in some installations stab-type connectors may be employed without any locking arrangement and the seal in the landing head 61 may be a static seal which is compressed against the landing mandrel 62 by the force of the landing head being forced down on the landing mandrel. Thus, in some installations neither pressure lines or electrical transmission lines would be needed to run down along side the marine conductor pipe.

The upper end of the marine conductor pipe would extend above the surface of the water a sufficient distance so that drilling mud could flow out of a discharge line 150 to a settling tank 151 on the vessel. If desired, a telescoping section 152 may be provided at the top of the marine conductor pipe 144 so as to allow for rise and fall of the vessel. A seal 153, although not necessary, may be arranged at the top of the telescoping section 152 so that a drill pipe 154 could rotate therein. In the event that a telescoping section 152 is not used at the top of the marine conductor pipe, the discharge pipe 150 would have to be flexible.

I claim as my invention:

1. Apparatus for drilling, completing and working over an underwater well from an operating platform positioned above the surface of a body of water, said apparatus comprising
    (a) a wellhead assembly positioned below the surface of the water,
        (1) said wellhead assembly having an upwardly extending central tubular landing mandrel and
        (2) at least one upwardly-extending tubular well member adjacent said mandrel and offset therefrom,
    (b) an operating platform positioned above the surface of the water,
    (c) a large-diameter marine conductor pipe extending from said wellhead assembly up to said operating platform
    (d) a tubular landing head secured to the lower end of said conductor pipe and adapted to be connected in telescopic arrangement on said central wellhead landing mandrel,
        (1) seal means carried by said landing head for sealing against said mandrel in a fluidtight manner,
    (e) small-diameter conduit means fixedly secured on the outside of said conductor pipe co-longitudinal therewith, said marine conductor and said small-diameter conduit means fixedly secured thereto comprising a plurality of interconnected substantially rigid pipe sections having fluidtight coupling means at the ends thereof, the mating portions of said connector means being axially movable in telescopic arrangement one within the other, and
    (f) stab-type connector means carried by said small-diameter conduit means at the lower end thereof for seating in a telescopic manner on said tubular well member of said wellhead assembly.

2. The apparatus of claim 1 including guide means at least a portion of which is carried by said landing head for engaging a cooperating portion of said wellhead assembly for guiding and aligning said landing head and said connector means on said landing mandrel and said tubular well member, respectively.

3. The apparatus of claim 1 including pressure line means secured to the outside of said conductor pipe and extending the length thereof, with
    (1) at least a portion of said pressure line means being in communication with the landing head for applying a pressure fluid thereto, and
    (2) another portion of said pressure line means being operatively connected to said connector means for applying pressure fluid thereto.

4. The apparatus of claim 3 including means fixedly securing said conduit means and said pressure line means to said conductor pipe.

5. The apparatus of claim 1 including pivotal linkage means secured between said landing head and said connector means of said conduit means,
    and means carried by said operating platform for securing the upper end of said conductor pipe in movable relation therewith.

6. The apparatus of claim 1 wherein a portion of the small-diameter conduit means near said connector means is flexible.

7. The apparatus of claim 1 wherein said landing head extends in parallel spaced arrangement beyond said connector means of said conduit means a distance whereby said landing head is in connectible arrangement on the landing mandrel of a wellhead assembly before said connector means telescopically engages a tubular well member.

References Cited by the Examiner

UNITED STATES PATENTS

| | | | |
|---|---|---|---|
| 2,606,003 | 8/52 | McNeill | 175—7 |
| 2,923,531 | 2/60 | Bauer et al. | 175—7 |
| 2,990,851 | 7/61 | Jackson et al. | 166—65.5 X |
| 3,041,090 | 6/62 | Ashe et al. | 166—66.5 X |
| 3,052,299 | 9/62 | Geer et al. | 166—66.5 |
| 3,071,188 | 1/63 | Raulins | 166—66.5 |

FOREIGN PATENTS

| | | |
|---|---|---|
| 873,482 | 7/61 | Great Britain. |
| 874,178 | 8/61 | Great Britain. |

CHARLES E. O'CONNELL, *Primary Examiner.*